United States Patent Office

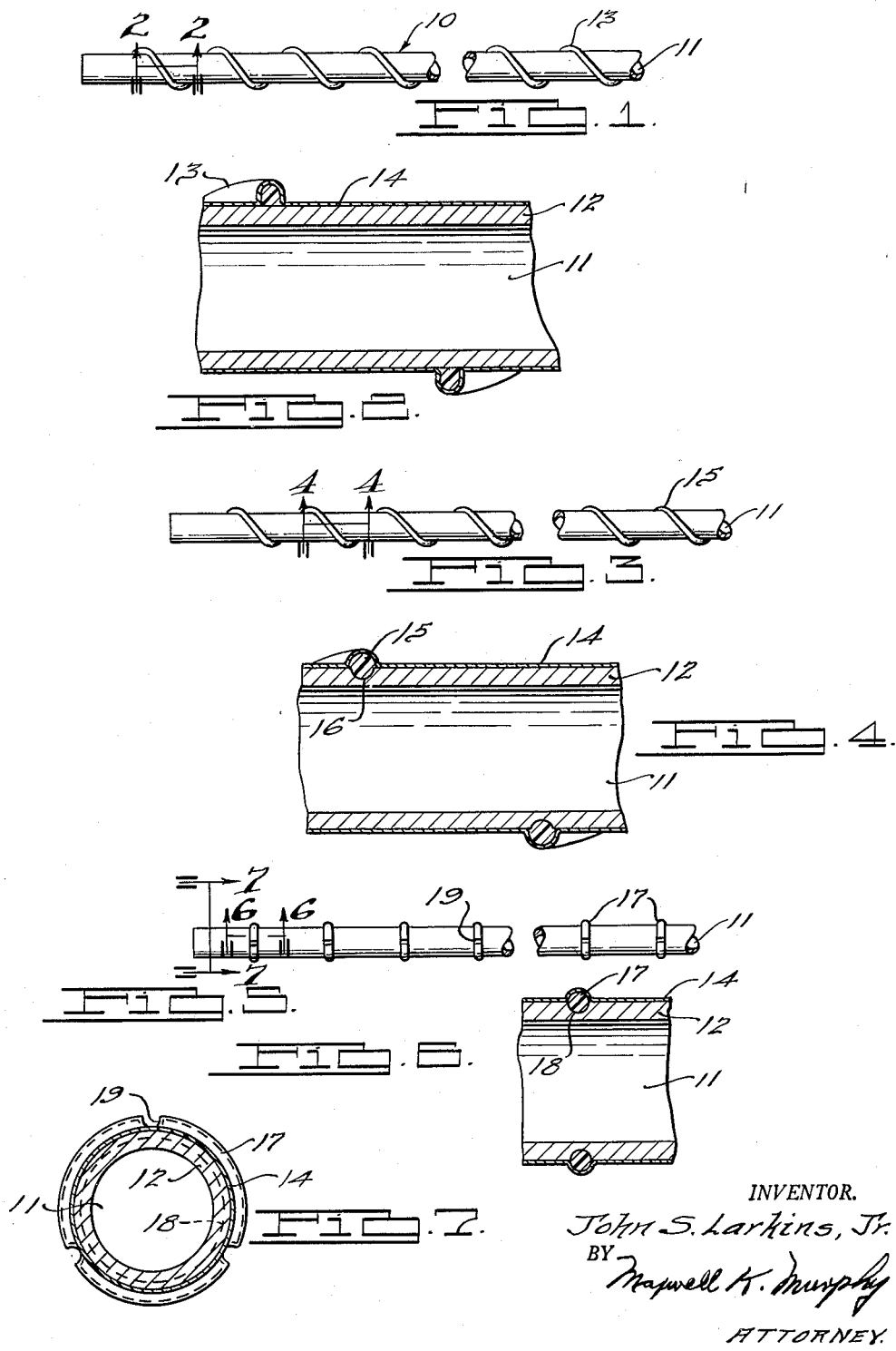

2,715,172
Patented Aug. 9, 1955

2,715,172

DEEP-HOLE ELECTRODE

John S. Larkins, Jr., Detroit, Mich., assignor to Elox Corporation of Michigan, Clawson, Mich., a corporation of Michigan Application November 28, 1952, Serial No. 323,101

6 Claims. (Cl. 219—15)

This invention relates to electrodes for use with electrical-discharge machining apparatus and particularly to electrodes for drilling relatively deep holes.

Drilling of holes in hard alloys by electrical-discharge machining, sometimes referred to as "arc machining" or "spark machining," has become increasingly important in recent years. Examples of the type of apparatus used are illustrated and described in McKechnie Patent No. 2,501,954 and in Harding Patent No. 2,592,894. While this apparatus was originally developed primarily for use in removing broken drills, taps, reamers, etc., from castings in which the broken pieces had become embedded, it was recognized that the method used in removing the broken tools, by disintegration of the tool itself without damage to the casting, could also be applied to the drilling of holes in metal alloys too hard for machining by conventional methods and apparatus.

Applications of the method to the machining of hard alloys have been successful, but it has been found that accuracy of dimension decreases rapidly as the depth of the drilled hole increases. This factor has seriously limited the usefulness of the method, particularly in its application to the drilling and tapping of deep holes in tungsten alloys and other extremely hard metals.

In electrical-discharge machining, the electrode is supported at one end, usually but not always in vertical position, and is vibrated axially at high frequency in such relation to the work that electrical discharges occur between the electrode and the work causing small particles of the workpiece to be eroded away. The preferred way of removing the eroded particles and keeping the workpiece area cool is to force a stream of coolant fluid through the electrode, which is tubular in construction. The coolant flows outwardly of the hole around the electrode thereby cooling the area of the workpiece adjacent the electrode and carrying away the eroded particles. Speed of drilling is important and requires that the coolant flow be of considerable volume and unimpeded. It is therefore obvious that there must be some clearance around the electrode to permit outward flow of the coolant, and accuracy requires that the clearance be as small as possible.

It was recognized that, in drilling deep holes, the electrode could be coated with a dielectric material which material would contact the bore of the hole during the operation. The dielectric material prevents electrical discharge between the body of the electrode and the wall of the hole, and the electrode is guided and restrained from radial vibration. Such a coated electrode, however, fills the hole entirely and leaves no clearance for outward flow of coolant. In addition, the coating wears off rapidly in places and permits discharge between the body of the electrode and the wall of the hole with consequent erosion of the bore.

My invention has for its principal object the provision of an electrode for drilling deep holes by electrical-discharge machining, which electrode is guided against radial vibration and yet does not impede coolant flow.

Other objects and advantages will become apparent from a reading of the following specification, which taken in connection with the accompanying drawings, discloses preferred embodiments of the invention.

In the drawings,

Fig. 1 is a fragmentary elevation of an electrode embodying the invention;

Fig. 2 is a sectional view on an enlarged scale taken on line 2—2 of Fig. 1;

Figs. 3 and 4 are similar views of a modified form of the invention;

Fig. 5 is a fragmentary elevation of a second modified form of the invention;

Fig. 6 is a sectional view on an enlarged scale taken on line 6—6 of Fig. 5; and Fig. 7 is a sectional view on a similar scale taken on line 7—7 of Fig. 5.

Referring now to Figs. 1 and 2, it will be seen that the electrode 10 comprises a hollow cylindrical member having an axial passage 11 surrounded by a wall 12. The electrode may be of any suitable electrically conductive material, but copper or copper alloy is preferred. A guide element 13 of dielectric material is wrapped around the electrode and fixed against displacement. The guide element in the example shown consists of 25 lb. test nylon fishing line and is wrapped helically around the electrode cylinder with a 5/8 inch pitch.

A thin coating of dielectric material 14 is placed over the entire structure as shown in the sectional view. This coating may be of varnish, resin, or the like, and is of a thickness on the order of .002–.005 inch. The coating secures the guide element in place and retains it against displacement during axial vibration of the electrode in drilling.

While nylon fishline is readily available and convenient to use as a guide element, other materials such as glass, silicon, impregnated cotton, etc., can be satisfactorily employed. Instead of wrapping an element about the electrode, the guide element may be sprayed or brushed on in the form of a helix or other form, it being only necessary to provide a continuous passage for flow of coolant.

The electrode body is unwrapped at one end (not shown) for a distance of approximately 1¾ inches to provide for chucking.

In use, the apparatus is adjusted to drill a hole sufficiently larger than the body of the electrode such that clearance for the guide 13 will be provided. As the electrode enters the hole, the guide engages the wall thereof and maintains the electrode centered in the hole during its working vibration stroke. The electrode may be withdrawn for inspection purposes and re-inserted in the hole with perfect centering. During operation of the drill, the guide permits coolant to flow without obstruction and prevents contact of the body of the electrode with the wall and prevents radial vibration of the electrode.

With the electrode just described, it is possible to cut holes of considerable depth with almost perfect dimensional control and almost perfect control of roundness.

Figs. 3 and 4 illustrate a modification wherein the guide element 15 is molded in a helical groove 16 formed in the electrode body. In this form, the guide is partially recessed and does not require as much clearance in the hole being drilled. The element 15 may be molded from powdered or liquid material, preferably by use of heat. The guide element 15, in this form, being molded in the groove 16, does not require an adhesive coating to retain it in place, but such a coating 14 is preferably used to prevent erosion of the hole by discharge from the body of the electrode, particularly when the coolant solution used is of low dielectric strength.

This form of the invention permits the drilling of deep holes with extreme accuracy, the clearance being less than that necessary with the modification just described because of the recessed guide member.

A third modification is illustrated in Figs. 5, 6 and 7. In this form, the guide means comprises a plurality of concentric elements 17. These elements are of annular form and are preferably but not necessarily recessed in concentric grooves 18 cut in the cylindrical body of the element. The elements 17 may be preformed of resilient material and stretched to mount them in the grooves or they may be molded in place from powdered or liquid dielectric material. An insulating coating 14 may be used or not as desired.

To permit passage of coolant, the rings 17 have slots 19 formed therein. Any number of slots may be used, such that the coolant flow is not unduly restricted.

With electrodes of the type above described used with properly designed apparatus, it is possible to drill deep holes in hard alloys with extremely close tolerances with respect to diameter and roundness. Holes of irregular shape may be cut with electrodes of proper shape.

I claim:

1. An electrode for cutting deep holes in metal workpieces by electrical discharge therefrom comprising, an elongated body member of electrically conductive material, a passageway in said body member to provide flow of coolant into the hole, a guide member of dielectric material secured to said body member and adapted to engage the wall of said hole thereby to provide clearance between said wall and said body for flow of coolant out of said hole and to center said body in said hole during cutting.

2. The combination set forth in claim 1 wherein the guide member consists of an element disposed helically around said body member.

3. The combination of claim 1 wherein the body member is provided with a helical groove in which the guide member is partially recessed.

4. The combination of claim 1 wherein the guide member consists of a ring disposed concentrically around said body member.

5. The combination of claim 4 wherein the body member is provided with a groove in which said ring is partially recessed.

6. An electrode for cutting deep holes comprising a body member of electrically conductive material having an internal coolant passageway, a guide member of dielectric material secured to said body member in such manner that it will engage the wall of the hole thereby spacing the body member therefrom, said guide member providing a passageway for flow of coolant between said body member and said wall, and a coating of dielectric material surrounding said body member.

References Cited in the file of this patent

UNITED STATES PATENTS

| | | |
|---|---|---|
| 1,341,647 | Jones | June 1, 1920 |
| 1,944,753 | Mathias | Jan. 23, 1934 |
| 2,270,013 | Smith | Jan. 13, 1942 |
| 2,494,029 | Bertalow et al. | Jan. 10, 1950 |